July 5, 1932.  R. M. GILSON  1,865,562
ELECTRICAL REGULATING APPARATUS
Filed Jan. 22, 1931
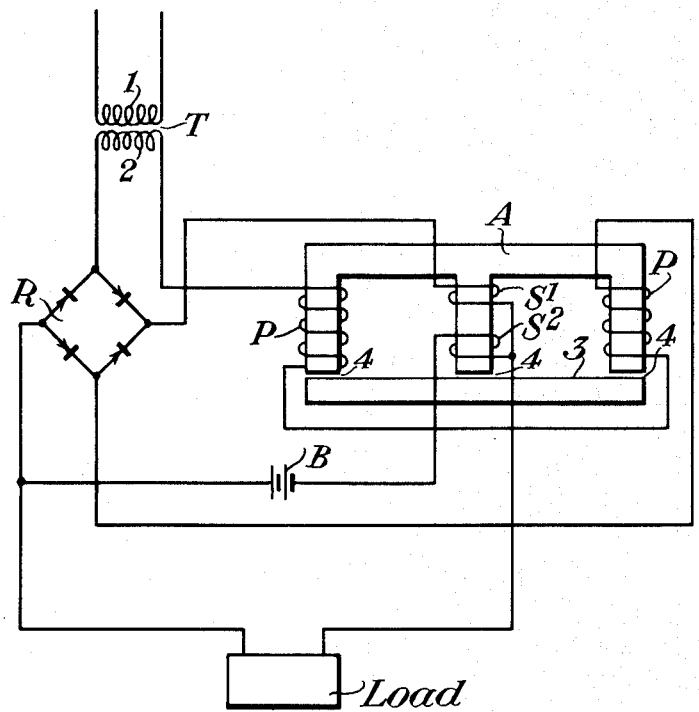
INVENTOR:
R. M. Gilson,
BY
His ATTORNEY.

Patented July 5, 1932

1,865,562

UNITED STATES PATENT OFFICE

ROBERT M. GILSON, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRICAL REGULATING APPARATUS

Application filed January 22, 1931. Serial No. 510,458.

My invention relates to electrical regulating apparatus, and particularly to apparatus of the type involving a direct current load supplied with power from a source of alternating current through a rectifier.

One feature of my invention is the provision, in apparatus of this character, of means for furnishing a constant direct current voltage to the load regardless of variations in the alternating current voltage and also regardless of variations in the amount of current drawn by the load.

Another feature of my invention is the provision, in apparatus of the character described, of means for providing a battery as a reserve source of power for the load.

The accompanying drawing is a diagrammatic view showing one form of apparatus embodying my invention.

Referring to the drawing, the reference character T designates a transformer, the primary 1 of which is supplied with alternating current from a source which is not shown in the drawing. The secondary 2 of the transformer T is connected with the input terminals of a full-wave rectifier R, and the output terminals of this rectifier are connected with a load. The reference character A designates a regulating device comprising a magnetizable core 3 having three parallel legs. A primary winding P is located on the two outer legs and is interposed between the secondary 2 and one of the input terminals of the rectifier R. The middle leg of the core 3 carries a main secondary winding $S^1$ which is interposed between one of the output terminals of rectifier R and one terminal of the load.

A battery B is connected across the load through an auxiliary secondary winding $S^2$ located on the middle leg of the core 3.

As the direct current drawn by the load increases, thereby increasing the current through the secondary winding $S^1$, the increased current in this winding reduces the impedance of the primary winding P, and so increases the voltage applied to the rectifier R. However, if the output voltage of the rectifier R becomes greater than the voltage of battery B, current will flow through the auxiliary secondary winding $S^2$ in such direction as to neutralize part of the saturating effect of the load current in winding $S^1$, thereby tending to increase the impedance of primary winding P and so to reduce the voltage delivered by the rectifier. On the other hand, if the voltage delivered by the rectifier drops below the voltage of battery B, current will flow from the battery to the load through the auxiliary secondary $S^2$, and this current will be in such direction as to assist the winding $S^1$ in reducing the impedance of primary P and so increasing the voltage delivered by the rectifier R until this voltage equals the battery voltage.

It follows that by properly proportioning the number of turns in the windings on the regulating device A, the apparatus may be made to function in such manner that the voltage delivered by the rectifier R will at all times equal the voltage of battery B. In the event of failure of the alternating current supply, battery B will function as a reserve source of current for the load at the same voltage as that which is supplied by the rectifier R when the alternating current source is available.

When the battery B is of the storage type, it may be desirable to supply a small trickle charge to this battery from the rectifier R while the rectifier is supplied with alternating current. To accomplish this, the regulating device A may be provided with a small air gap 4 in each leg, whereby the charging rate of the battery may be adjusted to the desired value.

Although I have herein shown and described only one form of regulating apparatus embodying my invention, it is understood that various changes and modifications may be made therein within the scope of the appended claim without departing from the spirit and scope of my invention.

Having thus described my invention, what I claim is:

In combination, a source of alternating current, a direct current load, a rectifier interposed between said source and said load, a regulating device having a primary winding interposed between said source and said rectifier and a main secondary winding interposed between said rectifier and said load, and a battery connected across said load through an auxiliary winding on said regulating device, the relation between the polarity of said battery and the direction of said auxiliary winding being such that the auxiliary winding opposes or aids the saturating effect of said main secondary winding according as the output voltage of said rectifier exceeds or is less than the voltage of the battery.

In testimony whereof I affix my signature.

ROBERT M. GILSON.